Feb. 9, 1954 J. T. LIERLEY 2,668,472
MOVABLE STAGE CONSTRUCTION AND PHOTOGRAPHING SYSTEM
Filed Sept. 15, 1949 2 Sheets-Sheet 1

INVENTOR.
JOHN T. LIERLEY,
By Chl R. Goshaw
ATTORNEY.

Feb. 9, 1954 J. T. LIERLEY 2,668,472
MOVABLE STAGE CONSTRUCTION AND PHOTOGRAPHING SYSTEM
Filed Sept. 15, 1949 2 Sheets-Sheet 2
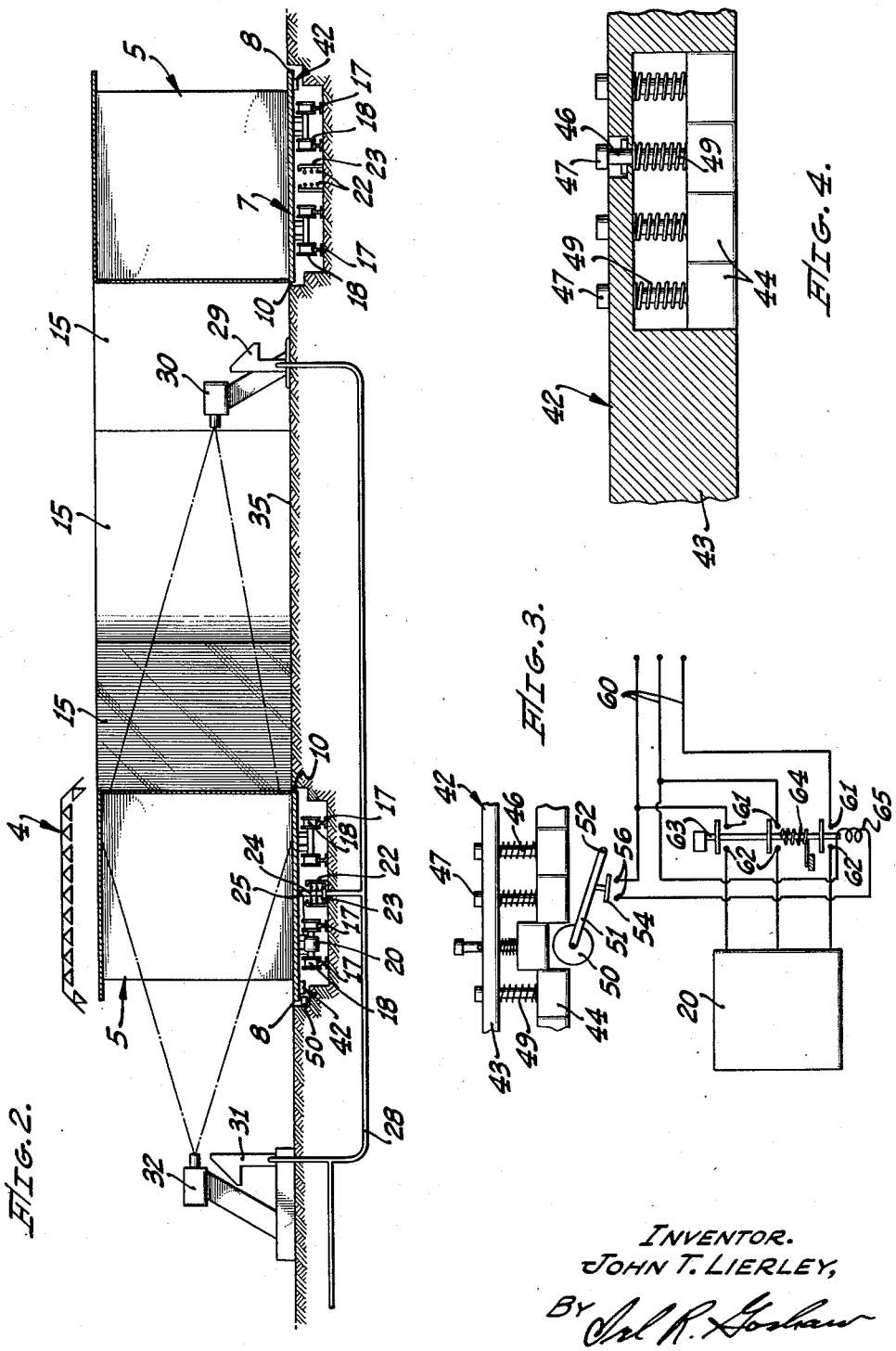
INVENTOR.
JOHN T. LIERLEY,
ATTORNEY.

Patented Feb. 9, 1954

2,668,472

UNITED STATES PATENT OFFICE 2,668,472

MOVABLE STAGE CONSTRUCTION AND PHOTOGRAPHING SYSTEM

John T. Lierley, Los Angeles, Calif.

Application September 15, 1949, Serial No. 115,845

7 Claims. (Cl. 88—16)

This invention relates to the production of motion pictures, and particularly to a stage or set arrangement for rapidly photographing a plurality of picture sequences having different settings. As disclosed and claimed in co-pending application, Ser. No. 110,343, filed August 15, 1949, a photographing camera or cameras are moved between fixed sets. The present invention reverses the relative movement by moving the sets instead of the camera.

It is well-known, in the art of motion pictures, that a large amount of time and many men are used in preparing a set for the action to take place thereon, in setting up the lamps for correctly illuminating the set, and in moving the cameras into their proper photographing positions. Also time consuming is the arranging of rear-projection screens in relation to the foreground action when process "shots" are made. The present invention eliminates a large number of the changes and movements of apparatus required in the photographing of motion pictures.

Briefly, the invention is directed to a movable or rotatable stage, which utilizes the central portion for the permanent location of a rear-projector or camera, if desired, and permits the camera or cameras to be fixedly positioned, the sets being arranged between substantially radial partitions, which may or may not be parallel. Openings may be made between the walls to permit a stationary camera to follow the action as it passes from one set to another during movement of the stage or to permit two cameras to follow the action when the stage is stationary. By fixedly locating the camera and a process screen projector, adjustments may be easily made thereto. Furthermore, since each set will be photographed in the same relative position with respect to fixed objects, a lamp blanket may be arranged over the photographing position and may be preadjusted and immediately lighted automatically in accordance with a pre-arranged cue sheet, as disclosed and claimed in co-pending application, Ser. No. 110,344, filed August 15, 1949. Thus, the sets on the rotating stages are dressed with respect to appointments and decorations, the sets moving into proper photographing position in accordance with the shooting schedule. Thus, the very rapid photographing of scenes may be accomplished without waiting for set and camera changes during the shooting. After a set has been photographed, workmen may rearrange the furniture or other articles on the set during its travel, so that the set may be made ready for photographing in accordance with the action of a subsequent sequence.

The principal object of the invention, therefore, is to facilitate the production of motion pictures.

Another object of the invention is to provide an improved method of and means for relatively positioning a set to be photographed with respect to the photographing camera.

A further object of the invention is to provide an improved method of and system for rapidly positioning a plurality of sets to be photographed before a camera and a cooperating rear-projection screen.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is a cross-sectional view, taken along the line 2—2 of Fig. 1.

Fig. 3 is a combination schematic and diagrammatic view of the motor control circuit, and Fig. 4 is a detailed view of the adjustable track units used in the invention.

Figure 1:
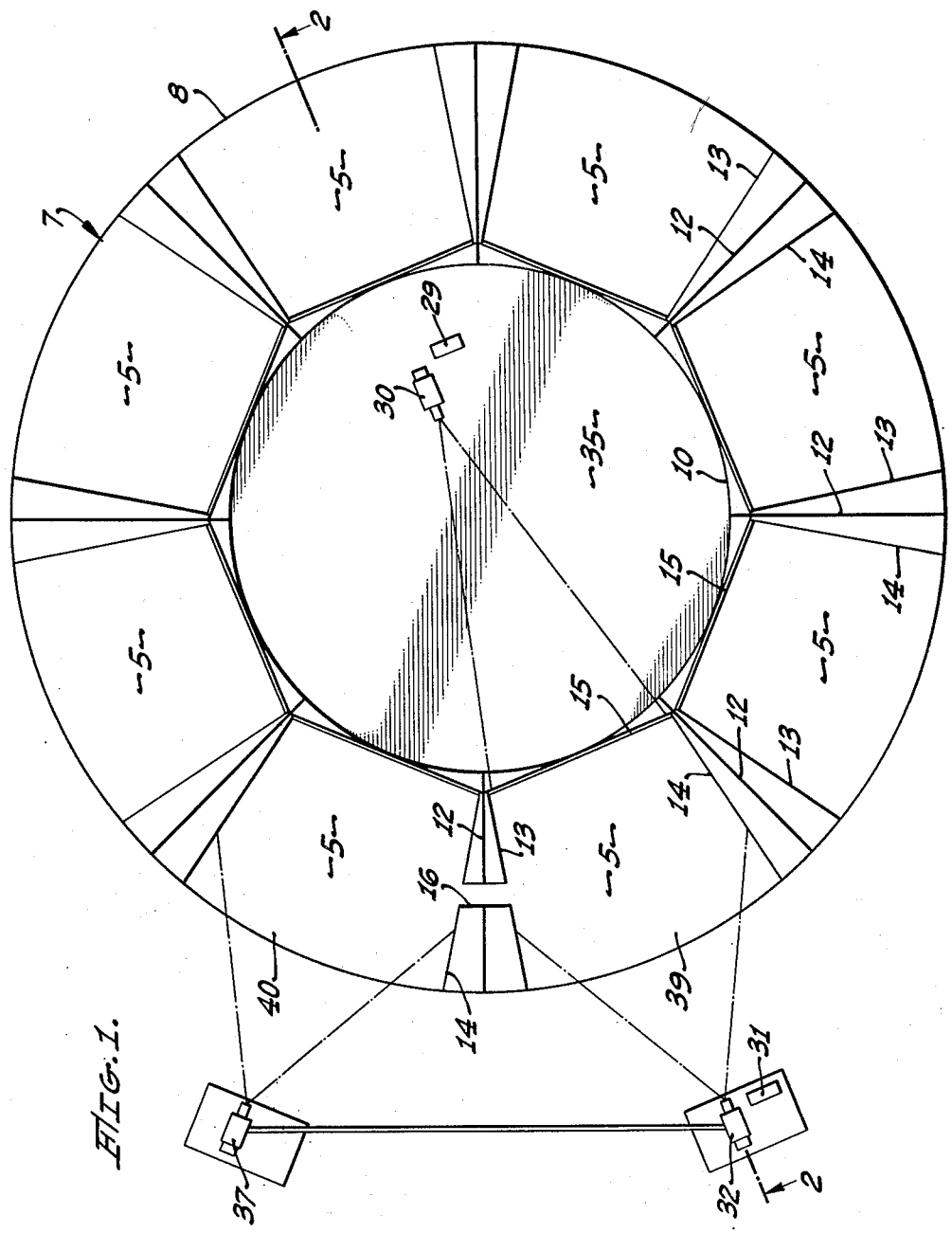
Fig. 1 is a plan view of a stage constructed in accordance with the invention.

Referring now to the drawings, in which the same numerals identify like elements, a plurality of set sections, such as shown generally at 5, are mounted on an annular, rotatable platform 7 having an outer, circular rim 8 and an inner, circular rim 10. The platform is divided into sets by the radial partitions 12, to which set walls 13 and 14 are attached. Some of the sets may have interconnecting passage ways, such as shown at 16, between sets 39 and 40. The back walls 15 of the sets will join the partitions 12. The platform 7 is supported on wheels 18, riding on four concentric rails 17. One or more motors, such as shown at 20, are mounted on the axles of a pair of wheels to rotate the stage when desired.

Positioned between the inner two rails, is a trolley gutter 22 having three trolley wire terminals 23, adapted to contact tripel trolley contacts 24, carried on a trolley 25. Power is supplied to the trolley wire 23 over conductors contained in a conduit 28, the conductors being connected to a power line and to the control panel 29 of a rear-projector 30 and the control panel 31 of a camera 32. The projector 30 may be positioned at a fixed location on the central section 35 and aligned with the camera 32 at a fixed location on the outside of the platform. A second camera 37 may be mounted at another fixed position and be operated in synchronism with the same camera 32 during passage of the action between two sets 39 and 40, with the sets stationary. A single camera can follow the action across a set and between sets when the sets move, which will save setting up camera dolly tracks. Furthermore, a camera could be placed at the position of projector 30 and a projector at the camera position.

The primary advantage of the revolving sets, is that they may be prepared or dressed prior to the photographing thereof and then rotated to bring them into photographing position, each set being at the same location when photographed. In the event that a process shot is to be made, a back wall 15 may be removed and a process screen dropped into position for that particular shot, the projector always being aligned and in position for projecting the background. The sets may be prepared the day or night before shooting, or the back sets may be worked on during the photographing of those in front of the camera, so that a continuous photographic operation may be provided without camera changes. The camera may be mounted on a dolly for adjustment toward and away from the set, as is well-known in the art. A light blanket 4 may be positioned over the set photographing position and controlled as disclosed and claimed in co-pending application, Ser. No. 110,344, filed August 15, 1949.

At the outer rim of the platform 7 and under it, a circular control track shown generally at 42 is provided, in order to automatically control the stopping of the sets in their proper positions. This track has a solid portion 43 of two widths, the narrow width sections extending over the stopping positions for each set. Over this range, the track has a plurality of block units 44, which are held extended by springs 49 on the end of bolts 46, it being possible, however, to retract any individual section 44 upwardly against the compression of the spring and against the narrow section of portion 43. By turning the handles 47 of each of the bolts, sections 44 may be locked in their notch, which forms an opening in the continuity of the track.

Attached to the floor of the stage, is a wheel 50 (see Fig. 3), mounted on an arm 51, pivoted at 52, the arm carrying a contact element 54, which closes a pair of contacts 56. Thus, when a section 44 is retracted, the wheel 50 will move into the notch and break the contacts 56. As also shown in Fig. 3, power is supplied from any suitable three-phase power source over conductors 60 to contacts 61, connection being made to contacts 62 when a switch 63 with a spring bias 64 is pressed. When the switch 63 is actuated, power is supplied to the motor 20 and the stage will start revolving, which moves the wheel 50 out of its opening to close the contacts 56, which completes a circuit through a holding relay winding 65, so that manual pressure on the switch 63 may be removed. The stage will then continue to revolve until the wheel 50 reaches another section 44, which has been retracted. In this manner, it is only necessary for the director or cameraman to press the start button and the stage will revolve to the next predetermined photographing position. That is, it may be desirable to skip one or more sets which are arranged for photographing, so that the proper sections 44 will be retracted to stop the sets in the positions according to a predetermined plan. If it is desired to reverse the stage movement, a second similar switch may be provided, as disclosed and claimed in my co-pending application, Ser. No. 115,844, filed September 15, 1949.

Although one form of system for automatically stopping the sets has been described, rack and pinion combinations could be used, while the control track could extend around the complete platform. Furthermore, the sets could be of various sizes and shapes from those shown in Fig. 1, and they could be arranged on a long rectangular platform, which could be moved rectilinearly before the cameras and projector.

I claim:

1. A stage set construction for obtaining a photograph of a moving object with a camera in a fixed position, comprising a photographing camera in a fixed position, a ring-shaped platform having at least one set thereon with action moving across said set, said camera being positioned beyond the outer circumference of said ring-shaped platform, said set having substantially parallel side walls, means for moving said set during movement of said action to maintain said action in photographing position in front of said camera, means for manually starting the movement of said set, and mechanical means under control of said moving set for stopping the movement of said set.

2. A stage set construction in accordance with claim 1, in which a second set is positioned adjacent said first set on said platform, said second set having substantially parallel walls to provide a certain wall thickness between sets, said sets being joined by an opening in the wall therebetween, said moving means moving both of said sets past said camera in timed relation with the moving of said action from one set to another through said opening to permit said fixedly positioned camera to follow the action as it moves from set to set.

3. A stage set construction for photographing a plurality of sets in a predetermined order comprising a movable, ring-shaped, circular platform, a plurality of sets constructed thereon, a background screen at the rear of each of said sets, a fixed circular platform within said ring-shaped platform, a projector on said fixed platform for projecting background scenes on said screens, a fixedly positioned camera having its optical axis substantially coincident with the optical axis of said projector for photographing said scenes projected by said projector on said screens, power means for rotating said movable platform to bring said sets into predetermined photographing positions in front of said camera and said projector, manual switch means for starting said movable platform, and mechanical switch means operated by movement of said circular platform for stopping said sets at said predetermined positions, said mechanical switch means including a sectionalized track on said platform, said track being adjustable at any point thereon, and a switch ridable on said track, the adjustment of any section of said track actuating said switch.

4. A stage set construction for photographing a plurality of sets from a fixed camera position comprising a movable ring-shaped platform, a fixed central platform within said movable platform, a plurality of sets constructed on said movable platform, a picture projector on said fixed central platform, background screens forming the rear walls of certain of said sets, said sets being dressed for different scenes, a camera fixedly located for photographing said sets, the optical axes of said camera and projector being in substantial alignment, power means for moving said movable platform, manual means for actuating said power means, and means actuated by said movable platform for automatically de-actuating said power means when a certain set is before said camera for photographing, said last mentioned means including a sectionalized track on said platform, said track being adjustable at points therealong, and a switch ridable on said track, the adjustment of any section of said track actuating said switch.

5. A stage set construction for photographing a plurality of sets from a fixed camera position comprising a movable ring-shaped platform, a fixed center platform within said movable platform, a plurality of sets constructed on said movable platform, said sets being dressed for different scenes, a camera fixedly located for photographing said sets, power means for moving said movable platform, manual means for actuating said power means, and means for automatically de-actuating said power means when a certain set is before said camera for photographing, said platform being circular and said last mentioned means is a track under said platform, a fixed adjustable control track for controlling the energy to said power means, a manual switch for energizing said power means, and a traveling switch actuated by said control track, said manual switch being held energized by said traveling switch until actuated by said control track.

6. A set photographing system comprising a fixed central platform, a movable, ring-shaped, circular platform encircling said fixed platform, means for moving said movable platform, a plurality of separated sets on said movable platform, a camera for photographing said sets, and automatically controlled power means for starting and stopping the movement of said movable platform, said last mentioned means including a track for said movable platform, a fixed control track of a plurality of adjustable sections, a traveling switch actuated by the adjustment of any one of said sections, and a manual switch for energizing said power means, said manual switch including means for maintaining said manual switch closed until said traveling switch is opened by an adjusted section of said control track.

7. A set photographing system comprising a fixed, central platform, a movable, ring-shaped, circular platform encircling said fixed platform, means for moving said movable platform, a plurality of separated sets on said movable platform, a camera for photographing said sets, and automatically controlled power means for starting and stopping the movement of said movable platform, said last mentioned means including a track for said movable platform, a fixed control track of a plurality of adjustable sections, a traveling switch actuated by the adjustment of any one of said sections, and a manual switch for energizing said power means, said manual switch including means for maintaining said manual switch closed until said traveling switch is opened by an adjusted section of said control track, said manual switch being located at said camera, and said traveling switch being a pivoted roller having a switch contact arm.

JOHN T. LIERLEY.

References Cited in the file of this patent

UNITED STATES PATENTS

| Number | Name | Date |
| --- | --- | --- |
| 479,001 | Gutierrez | July 19, 1892 |
| 748,116 | Stoll | Dec. 29, 1903 |
| 1,045,398 | Hagen | Nov. 26, 1912 |
| 1,102,595 | Knight | July 7, 1914 |
| 1,294,686 | McCormick | Feb. 18, 1919 |
| 1,400,091 | Munderback | Dec. 13, 1921 |
| 1,563,550 | Brown | Dec. 1, 1925 |
| 1,729,397 | Meuche | Sept. 24, 1929 |
| 1,797,286 | Glagolin | Mar. 24, 1931 |
| 1,979,363 | Berkeley | Nov. 6, 1934 |
| 2,030,300 | Jackman | Feb. 11, 1936 |
| 2,123,529 | Goosson | July 12, 1938 |
| 2,290,242 | Kasold | July 21, 1942 |
| 2,382,616 | Del Riccio | Aug. 14, 1945 |

FOREIGN PATENTS

| Number | Country | Date |
| --- | --- | --- |
| 439,969 | Great Britain | Dec. 18, 1935 |

OTHER REFERENCES

Alton, John, "Transparency Set Turntable," page 22 of International Projectionist for November 1946.